US012761727B2

(12) United States Patent
Cha et al.

(10) Patent No.: US 12,761,727 B2
(45) Date of Patent: Oct. 13, 2026

(54) IMAGE SENSOR, IMAGE PROCESSING SYSTEM INCLUDING THE IMAGE SENSOR AND OPERATING METHOD OF THE IMAGE PROCESSING SYSTEM

(71) Applicant: SK hynix Inc., Gyeonggi-do (KR)

(72) Inventors: Su Ram Cha, Gyeonggi-do (KR); Young Ho Yoo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 232 days.

(21) Appl. No.: 18/429,428

(22) Filed: Feb. 1, 2024

(65) Prior Publication Data

US 2024/0361834 A1 Oct. 31, 2024

(30) Foreign Application Priority Data

Apr. 27, 2023 (KR) ........................ 10-2023-0055340
Oct. 26, 2023 (KR) ........................ 10-2023-0144714

(51) Int. Cl.
*G06F 3/01* (2006.01)
*G06T 5/70* (2024.01)
*G06V 10/25* (2022.01)
*G06V 40/16* (2022.01)

(52) U.S. Cl.
CPC .............. *G06F 3/013* (2013.01); *G06F 3/012* (2013.01); *G06T 5/70* (2024.01); *G06V 10/25* (2022.01); *G06V 40/161* (2022.01)

(58) Field of Classification Search
None
See application file for complete search history.

(56) References Cited

U.S. PATENT DOCUMENTS 10,109,056 B2 * 10/2018 Nguyen .................. G06T 7/277
11,093,030 B2 * 8/2021 Akahori ................. G06V 40/18
11,682,107 B2 * 6/2023 Shintani ................. G01S 17/32 348/46
12,056,276 B1 * 8/2024 Chapiro .................. G06F 3/011
2014/0063052 A1 * 3/2014 Choi ....................... G06F 3/013 345/629
2015/0286853 A1 * 10/2015 Shapovalova .......... G06F 18/24 382/103
2016/0307038 A1 * 10/2016 Skogö .................... G06V 40/18
2017/0076135 A1 * 3/2017 Ronnecke .............. A61B 3/113
2018/0227630 A1 * 8/2018 Schmidt ........... H04N 21/44218
2018/0270436 A1 * 9/2018 Ivarsson ................. G06F 3/012
2020/0342212 A1 * 10/2020 Lemley ................ G06V 40/165
2020/0387219 A1 * 12/2020 Chappell ................. G06F 3/005

* cited by examiner

*Primary Examiner* — Talha M Nawaz
(74) *Attorney, Agent, or Firm* — IP&T GROUP LLP

(57) ABSTRACT

Disclosed is an image sensor, an image processing system including the image sensor, and an operating method of the image processing system, the image sensor including a first detection circuit configured to detect an eye region of a user from an information image obtained by capturing an image of the user, a first probability map generation circuit configured to generate a first probability map which corresponds to a direction in which the user's eyes gaze, based on the eye region, and a storage circuit configured to store the first probability map.

17 Claims, 8 Drawing Sheets

[ANGLE OF USER'S FACE]

[SECOND PROBABILITY MAP(PM2)]

[ANGLE OF USER'S FACE]

| | | |
|---|---|---|
| LT | CT | RT |
| LC | CC | RC |
| LB | CB | RB |

[SECOND PROBABILITY MAP(PM2)]

IMAGE SENSOR, IMAGE PROCESSING SYSTEM INCLUDING THE IMAGE SENSOR AND OPERATING METHOD OF THE IMAGE PROCESSING SYSTEM

CROSS-REFERENCE TO RELATED APPLICATION(S)

This application claims priority under 35 U.S.C. § 119 to Korean Patent Application No. 10-2023-0055340, filed on Apr. 27, 2023, and Korean Patent Application No. 10-2023-0144714, filed on Oct. 26, 2023, which are both incorporated herein by reference in their entirety.

BACKGROUND

1. Field

Various embodiments of the present disclosure relate to a semiconductor design technique, and more particularly, to an image sensor, an image processing system including the image sensor and an operating method of the image processing system.

2. Description of the Related Art

Image sensors are devices for capturing images using the property of a semiconductor which reacts to light. Image sensors may be roughly classified into charge-coupled device (CCD) image sensors and complementary metal-oxide semiconductor (CMOS) image sensors. Recently, CMOS image sensors are widely used because the CMOS image sensors can allow both analog and digital control circuits to be directly implemented on a single integrated circuit (IC).

Recently, an image processing system such as a smartphone includes multiple image sensors. The smartphone includes, for example, a first image sensor corresponding to a rear camera and a second image sensor corresponding to a front camera. The first and second image sensors may operate individually or dependently on each other, depending on their functions.

SUMMARY

Various embodiments of the present disclosure are directed to an image processing system capable of automatically adjusting setting information required for functions (e.g., auto white balance, auto exposure, and auto focus) of a first image sensor corresponding to a rear camera on the basis of an information image generated from a second image sensor corresponding to a front camera, and an operating method of the image processing system.

In addition, various embodiments of the present disclosure are directed to an image sensor capable of automatically detecting a region of interest desired by a user from a captured image.

In accordance with an embodiment of the present disclosure, an image sensor may include: a first detection circuit configured to detect an eye region of a user from an information image obtained by capturing an image of the user; a first probability map generation circuit configured to generate a first probability map which corresponds to a direction in which the user's eyes gaze, based on the eye region; and a storage circuit configured to store the first probability map.

In accordance with an embodiment of the present disclosure, an image processing system may include: a first image sensor configured to perform at least one function on a region of interest, which a user gazes at, based on setting information, and obtain a captured image including the region of interest; a second image sensor configured to generate a first probability map which corresponds to a direction in which the user's eyes gaze, based on an information image obtained by capturing an image of the user; and an image processor configured to detect the region of interest based on the captured image and the first probability map, and adjust the setting information based on the region of interest.

In accordance with an embodiment of the present disclosure, an operating method of an image processing system having a front camera, a rear camera, and an image processor may include: enabling the rear camera in a normal mode and enabling the front camera in a low power mode; capturing, by the front camera, an image of a user, and generating a first probability map representing a direction in which the user's eyes gaze; detecting, by the image processor, a region of interest which the user's eyes gaze at, based on the first probability map; adjusting, by the image processor, setting information corresponding to the region of interest; and performing, by the rear camera, at least one function on the region of interest based on the setting information, and obtaining a captured image including the region of interest.

DETAILED DESCRIPTION

Various embodiments of the present disclosure are described below with reference to the accompanying drawings, in order to describe in detail the embodiments of the present disclosure so that those with ordinary skill in art to which the present disclosure pertains may easily carry out the technical spirit of the present disclosure.

It will be understood that when an element is referred to as being "connected to" or "coupled to" another element, the element may be directly connected to or coupled to the another element, or electrically connected to or coupled to the another element with one or more elements interposed therebetween. In addition, it will also be understood that the terms "comprises," "comprising," "includes," and "including" when used in this specification do not preclude the presence of one or more other elements but may further include or have the one or more other elements, unless otherwise mentioned. In the description throughout the specification, some components are described in singular forms, but the present disclosure is not limited thereto, and it will be understood that the components may be formed in plural.

Figure 1:
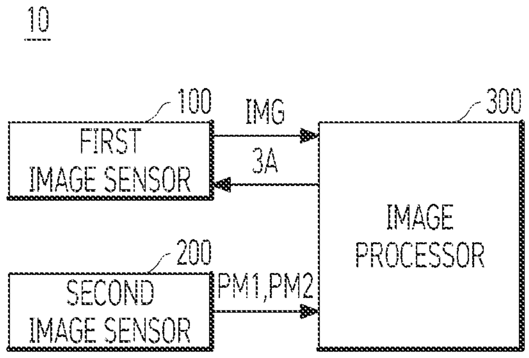
FIG. 1 is a block diagram illustrating an image processing system in accordance with an embodiment of the present disclosure.

FIG. 1 is a block diagram illustrating an image processing system 10 in accordance with an embodiment of the present disclosure.

Referring to FIG. 1, the image processing system 10 may be an electronic device such as a smartphone. For example, the image processing system 10 may include a first image sensor 100, a second image sensor 200, and an image processor 300.

The first image sensor 100 may be provided on the rear of the image processing system 10. For example, the first image sensor 100 may be a rear camera for capturing the rear of the image processing system 10. Typically, a display (not illustrated) of the image processing system 10 is configured on the front of the image processing system 10, and a user checks a desired region of interest through the display, and therefore, although it is described as an example in the present embodiment that the first image sensor 100 is the rear camera, the first image sensor 100 may be provided on one side of the image processing system 10 and be a camera that captures the region of interest, depending on design of the image processing system 10.

The first image sensor 100 may perform at least one function for the region of interest, which the user gazes at, on the basis of setting information 3A. The first image sensor 100 may obtain a captured image IMG including the region of interest.

The second image sensor 200 may be provided on the front of the image processing system 10. The second image sensor 200 may be a front camera for capturing the front of the image processing system 10. Typically, the display of the image processing system 10 is configured on the front of the image processing system 10, and the user checks the region of interest through the display. Therefore, although it is described as an example of an embodiment that the second image sensor 200 is the front camera, the second image sensor 200 may be provided on the other side of the image processing system 10 and be a camera that captures the user, depending on design of the image processing system 10.

The second image sensor 200 may generate a first probability map PM1 corresponding to a direction in which the user's eyes gaze, that is, a gaze direction of the user's pupils, on the basis of an information image DIMG (refer to FIG. 4) obtained by capturing the user. The first probability map PM1 may be a table that probabilistically represents coordinates corresponding to a location of the user's pupils. In addition, the second image sensor 200 may generate a second probability map PM2 corresponding to an angle of the user's face, on the basis of the information image DIMG obtained by capturing the user. The second probability map PM2 may be a table that probabilistically represents coordinates corresponding to the angles of the user's face. The second image sensor 200 may enter a low power mode when generating the information image DIMG and the first probability map PM1 and/or the second probability map PM2. The second image sensor 200 may operate at a lower resolution and lower frame rate in the low power mode than those used in a normal mode, which makes it possible to reduce power consumption of the second image sensor 200.

The image processor 300 may detect the region of interest on the basis of the captured image IMG and the first probability map PM1 and/or the second probability map PM2, and adjust the setting information 3A on the basis of the region of interest. The image processor 300 may blur surrounding regions other than the region of interest when the captured image IMG is generated.

Figure 2:
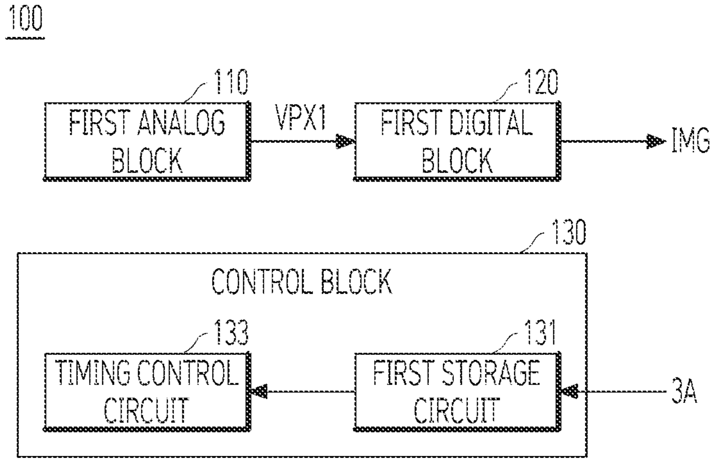
FIG. 2 is a detailed block diagram illustrating a first image sensor illustrated in FIG. 1.

FIG. 2 is a detailed block diagram illustrating the first image sensor 100 illustrated in FIG. 1.

Referring to FIG. 2, the first image sensor 100 may include a first analog block 110, a first digital block 120, and a control block 130.

The first analog block 110 may generate first image signals VPX1 on the basis of incident light input through the rear of the image processing system 10. The first image signals VPX1 may be analog signals.

The first digital block 120 may generate the captured image IMG on the basis of the first image signals VPX1. The captured image IMG may include digital signals converted from the first image signals VPX1.

The control block 130 may control at least one function on the basis of the setting information 3A received from the image processor 300. The function may include at least one of auto white balance, auto exposure, and auto focus. The setting information 3A may include at least one of a first setting value related to the auto white balance, a second setting value related to the auto exposure, and a third setting value related to the auto focus.

For example, the control block 130 may include a first storage circuit 131 and a timing control circuit 133.

The first storage circuit 131 may store and update the setting information 3A.

The timing control circuit 133 may control the at least one function on the basis of the setting information 3A. For example, the timing control circuit 133 may correct a color temperature of the region of interest on the basis of the first setting value, correct exposure time of the region of interest on the basis of the second setting value, and correct a focus of the region of interest on the basis of the third setting value.

Figure 3:
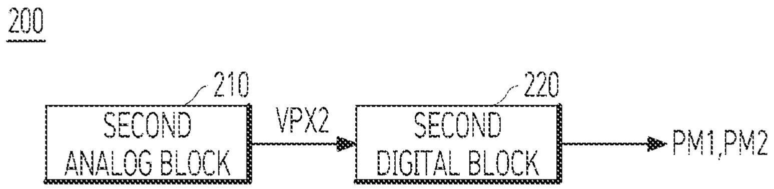
FIG. 3 is a detailed block diagram illustrating a second image sensor illustrated in FIG. 1.

FIG. 3 is a detailed block diagram illustrating the second image sensor 200 illustrated in FIG. 1.

Referring to FIG. 3, the second image sensor 200 may include a second analog block 210 and a second digital block 220.

The second analog block 210 may generate second image signals VPX2 on the basis of incident light input through the front of the image processing system 10. The second image signals VPX2 may be analog signals.

The second digital block 220 may generate the information image DIMG and the first probability map PM1 and/or the second probability map PM2 on the basis of the second image signals VPX2.

Figure 4:
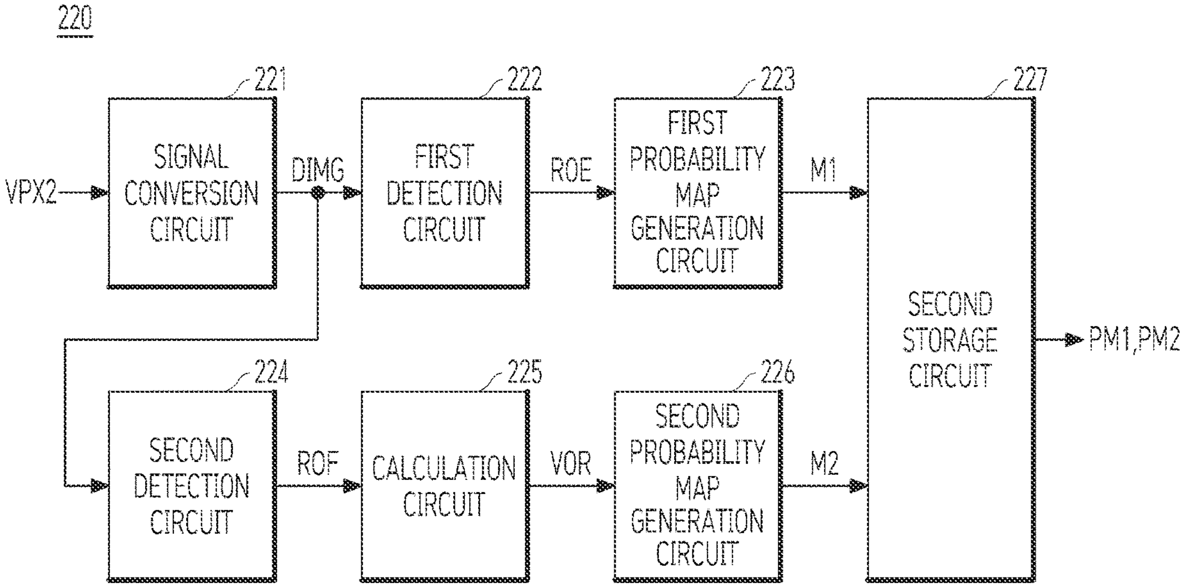
FIG. 4 is a detailed block diagram illustrating a second digital block illustrated in FIG. 3.

FIG. 4 is a detailed block diagram illustrating the second digital block 220 illustrated in FIG. 3.

Referring to FIG. 4, the second digital block 220 may include a signal conversion circuit 221, a first detection circuit 222, a first probability map generation circuit 223, a second detection circuit 224, a calculation circuit 225, a second probability map generation circuit 226, and a second storage circuit 227.

The signal conversion circuit 221 may generate the information image DIMG on the basis of the second image signals VPX2. The information image DIMG may include digital signals converted from the second image signals VPX2.

The first detection circuit 222 may detect an eye region ROE of the user from the information image DIMG.

The first probability map generation circuit 223 may generate the first probability map PM1 on the basis of the eye region ROE. For example, the first probability map generation circuit 223 may generate the first probability map PM1 that probabilistically represents coordinates corresponding to the gaze directions of the user's pupils in the eye region ROE (refer to FIG. 7).

The second detection circuit 224 may detect a face region ROF of the user from the information image DIMG.

The calculation circuit 225 may calculate at least one rotation value VOR of the user's face on the basis of the face region ROF. The rotation value VOR may include at least one of a roll value of the user's face, a pitch value of the user's face, and a yaw value of the user's face.

The second probability map generation circuit 226 may generate the second probability map PM2 corresponding to the angle of the user's face on the basis of the rotation values VOR. For example, the second probability map generation circuit 226 may generate the second probability map PM2 that probabilistically represents the coordinates corresponding to the angles of the user's face.

The second storage circuit 227 may store the first probability map PM1 and/or the second probability map PM2.

In the present embodiment, it is described as an example that the first detection circuit 222, the first probability map generation circuit 223, the second detection circuit 224, the calculation circuit 225, the second probability map generation circuit 226, and the second storage circuit 227 are included in the second image sensor 200, but it is not necessarily limited thereto, and all or part of the components 222, 223, 224, 225, 226, and 227 may be included in the image processor 300.

Figure 5:
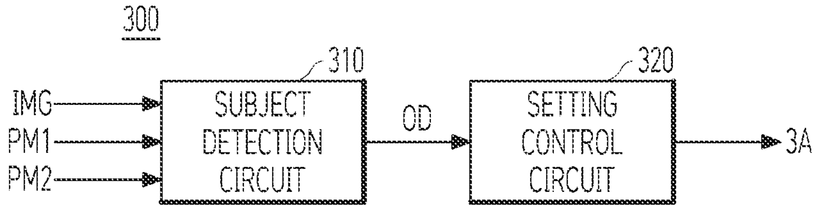
FIG. 5 is a detailed block diagram illustrating an image processor illustrated in FIG. 1.

FIG. 5 is a detailed block diagram illustrating the image processor 300 illustrated in FIG. 1.

Referring to FIG. 5, the image processor 300 may include a subject detection circuit 310 and a setting control circuit 320. The subject detection circuit 310 may detect the region of interest on the basis of the captured image IMG and the first probability map PM1 and/or the second probability map PM2, and detect a subject OD included in the region of interest. That is, the subject detection circuit 310 may detect the subject OD that the user gazes at.

The setting control circuit 320 may adjust the setting information 3A for the subject OD on the basis of the captured image IMG and the subject OD.

Hereinafter, an operation of the image processing system 10 in accordance with an embodiment of the present disclosure, which has the above-described configuration, is described with reference to FIGS. 6 to 8. Hereinafter, the first image sensor 100 is referred to as a "rear camera", and the second image sensor 200 is referred to as a "front camera."

Figure 6:
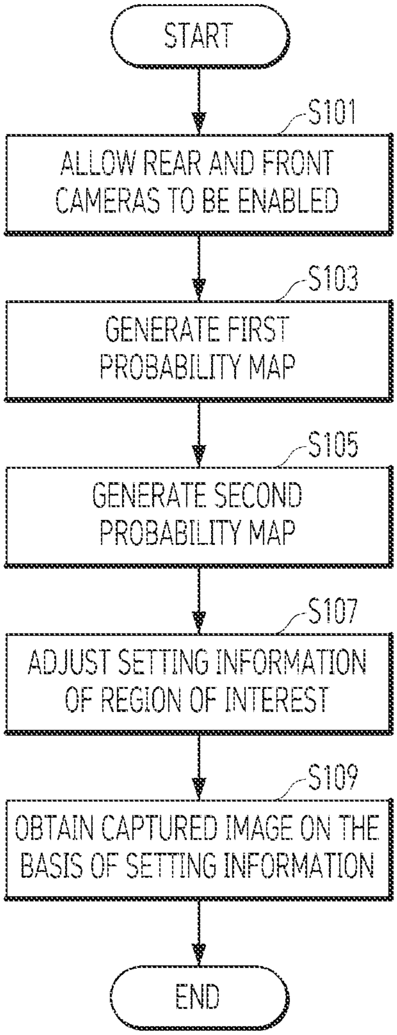
FIG. 6 is a flowchart illustrating an operation of an image processing system in accordance with an embodiment of the present disclosure.

FIG. 6 is a flowchart illustrating the operation of the image processing system 10 in accordance with an embodiment of the present disclosure.

Referring to FIG. 6, when the rear camera 100 is enabled, the front camera 200 may be enabled in operation S101. The rear camera 100 may enter the normal mode and generate the captured image IMG according to a predetermined resolution and a predetermined frame rate, and the front camera 200 may enter the low power mode and generate the first probability map PM1 and/or the second probability map PM2 according to a lower resolution and lower frame rate than those used in the normal mode. The front camera 200 may operate at the low resolution and low frame rate during the low power mode, which makes it possible to reduce power consumption of the front camera 200.

The front camera 200 may capture the user and generate the first probability map PM1 that probabilistically represents the direction in which the user's eyes gaze, in operation S103. The front camera 200 may generate the second probability map PM2 that probabilistically represents the angle of the user's face, in operation S105. Depending on design, the front camera 200 might not generate the second probability map PM2 when the reliability of the first probability map PM1 is high.

The image processor 300 may detect the region of interest, which the user gazes at, from the captured image IMG on the basis of the first probability map PM1 and/or the second probability map PM2, and adjust the setting information 3A corresponding to the region of interest, in operation S107. The setting information 3A may include a first setting value related to auto white balance, a second setting value related to auto exposure, and a third setting value related to auto focus.

The rear camera 100 may perform at least one function for the region of interest on the basis of the setting information 3A, and obtain the captured image IMG including the region of interest, in operation S109. The function may include at least one of the auto white balance, the auto exposure, and the auto focus.

The image processor 300 may blur surrounding regions other than the region of interest when the captured image IMG is generated.

Figure 7:
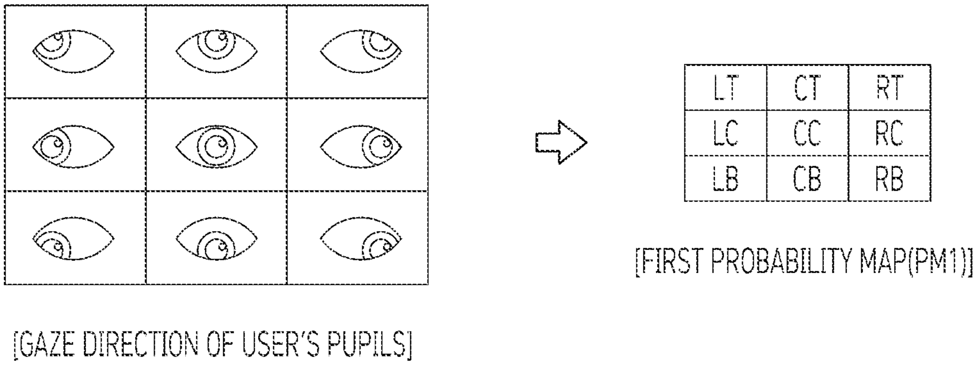
FIGS. 7 and 8 are diagrams additionally for describing the operation of the image processing system illustrated in FIG. 6.

FIG. 7 is a diagram illustrating the first probability map PM1 illustrated in FIG. 6.

Referring to FIG. 7, the first probability map PM1 may probabilistically represent coordinates corresponding to the gaze directions of the user's pupils in the eye region ROE. When the gaze directions of the user's pupils are set to nine, the first probability map PM1 may also have nine coordinates LT, CT, RT, LC, CC, RC, LB, CB, and RB. The nine coordinates LT, CT, RT, LC, CC, RC, LB, CB, and RB may be represented as a probability value or a digital value 0 or 1 depending on the gaze directions of the user's pupils among the nine gaze directions of the user's pupils.

Figure 8:
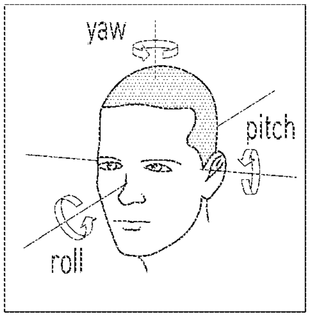

FIG. 8 is a diagram illustrating the second probability map PM2 illustrated in FIG. 6.

Referring to FIG. 8, the second probability map PM2 may probabilistically represent coordinates corresponding to the angles of the user's face in the face region ROF. For example, the angles of the user's face may correspond to the rotation values VOR of the user's face. The rotation value VOR may include at least one of a roll value of the user's face, a pitch value of the user's face, and a yaw value of the user's face. When the angles of the user's face are set to nine, the second probability map PM2 may also have nine coordinates LT, CT, RT, LC, CC, RC, LB, CB, and RB. The nine coordinates LT, CT, RT, LC, CC, RC, LB, CB, and RB may be represented as a probability value or a digital value 0 or 1 depending on the angles corresponding to the gaze directions of the user among the nine angles of the user's face.

According to an embodiment of the present disclosure, it is possible to automatically detect a region of interest desired by a user and automatically perform a predetermined operation, for example, a white balancing operation, an exposure operation, and a focusing operations, on the region of interest.

According to an embodiment of the present disclosure, as a region of interest desired by a user is automatically detected, and a predetermined operation, for example, a white balancing operation, an exposure operation, and a focusing operations, is automatically performed on the region of interest, the user may easily obtain a desired image without manual manipulation.

While the present disclosure has been illustrated and described with respect to specific embodiments, the disclosed embodiments are provided for description, and are not intended to be restrictive. Further, it is noted that the present disclosure may be achieved in various ways through substitution, change, and modification that fall within the scope of the following claims, as those skilled in the art will recognize in light of the present disclosure. Furthermore, the embodiments may be combined to form additional embodiments.

What is claimed is:

1. An image processing system comprising:

a first image sensor configured to perform at least one function on a region of interest, which a user gazes at, based on setting information, and obtain a captured image including the region of interest in a normal mode;

a second image sensor configured to generate a first probability map which corresponds to a direction in which the user's eyes gaze, based on an information image obtained by capturing an image of the user in a low power mode having a lower resolution and lower frame rate than a resolution and frame rate used in the normal mode; and an image processor configured to detect the region of interest based on the captured image received from the first image sensor and the first probability map received from the second image sensor, and adjust the setting information based on the region of interest.

2. The image processing system of claim 1, wherein:

the at least one function includes at least one of auto white balance, auto exposure, and auto focus; and the setting information includes at least one of a setting value related to the auto white balance, a setting value related to the auto exposure, and a setting value related to the auto focus.

3. The image processing system of claim 1, wherein the first probability map includes a table probabilistically representing coordinates corresponding to a location of the user's pupils.

4. The image processing system of claim 1, wherein the first image sensor includes:

a first analog block configured to generate first image signals based on incident light input through the rear of the image processing system;

a first digital block configured to generate the captured image based on the first image signals generated from the first analog block; and a control block configured to control the at least one function based on the setting information received from the image processor.

5. The image processing system of claim 4, wherein the control block includes:

a first storage circuit configured to store and update the setting information; and a timing control circuit configured to control the at least one function based on the setting information.

6. The image processing system of claim 1, wherein the second image sensor is configured to obtain, in the low power mode, the information image and generate the first probability map.

7. The image processing system of claim 1, wherein:

the second image sensor is further configured to generate a second probability map which corresponds to an angle of the user's face, based on the information image obtained by capturing an image of the user; and the image processor is further configured to use the second probability map when detecting the region of interest.

8. The image processing system of claim 1, wherein the second image sensor includes:

a second analog block configured to generate second image signals based on incident light input through the front of the image processing system; and a second digital block configured to generate the information image and the first probability map based on the second image signals generated from the second analog block.

9. The image processing system of claim 1, wherein the second digital block includes:

a first detection circuit configured to detect an eye region of the user from the information image;

a first probability map generation circuit configured to generate the first probability map based on the eye region detected by the first detection circuit; and a second storage circuit configured to store the first probability map.

10. The image processing system of claim 9, wherein the second digital block further includes:

a second detection circuit configured to detect a face region of the user from the information image obtained by capturing an image of the user;

a calculation circuit configured to calculate at least one rotation value of the user's face based on the face region detected by the second detection circuit; and a second probability map generation circuit configured to generate a second probability map which corresponds to an angle of the user's face, based on the at least one rotation value calculated by the calculation circuit.

11. The image processing system of claim 10, wherein the at least one rotation value include at least one of a roll value of the user's face, a pitch value of the user's face, and a yaw value of the user's face.

12. The image processing system of claim 10, wherein the second probability map includes a table probabilistically representing coordinates corresponding to the angle of the user's face.

13. The image processing system of claim 1, wherein the image processor is configured to blur surrounding regions other than the region of interest when the captured image is generated.

14. The image processing system of claim 1, wherein the image processor includes:

a subject detection circuit configured to detect a subject included in the region of interest, based on the captured image and the first probability map; and a setting control circuit configured to adjust the setting information for the subject based on the captured image and the subject.

15. An operating method of an image processing system having a front camera, a rear camera, and an image processor, the operating method comprising:

enabling the rear camera in a normal mode and enabling the front camera in a low power mode having a lower resolution and lower frame rate than a resolution and frame rate used in the normal mode;

capturing, by the front camera, an image of a user in the normal mode, and generating a first probability map representing a direction in which the user's eyes gaze;

detecting, by the image processor, a region of interest which the user's eyes gaze at, based on the first probability map;

adjusting, by the image processor, setting information corresponding to the region of interest; and performing, by the rear camera, at least one function on the region of interest based on the setting information, and obtaining a captured image including the region of interest.

16. The operating method of claim 15, further comprising generating a second probability map which corresponds to an angle of the user's face, based on information image obtained by capturing an image of the user by the front camera, wherein the image processor further uses the second probability map when detecting the region of interest.

17. The operating method of claim 15, wherein the image processor blurs surrounding regions other than the region of interest while the captured image is obtained by the rear camera.

* * * * *